(12) United States Patent
Boutin et al.

(10) Patent No.: US 11,583,791 B2
(45) Date of Patent: Feb. 21, 2023

(54) FILTER ELEMENT FOR A VEHICLE

(71) Applicant: VOLVO TRUCK CORPORATION, Gothenburg (SE)

(72) Inventors: Baptiste Boutin, La Tour du Pin (FR); Hervé Coste, Roche (FR); Bertrand Cauvin, Reyrieux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 704 days.

(21) Appl. No.: 16/311,210

(22) PCT Filed: Jun. 21, 2016

(86) PCT No.: PCT/IB2016/000981
§ 371 (c)(1),
(2) Date: Dec. 19, 2018

(87) PCT Pub. No.: WO2017/221043
PCT Pub. Date: Dec. 28, 2017

(65) Prior Publication Data
US 2019/0193003 A1    Jun. 27, 2019

(51) Int. Cl.
*B01D 35/30* (2006.01)
*B01D 29/21* (2006.01)
*B01D 29/96* (2006.01)

(52) U.S. Cl.
CPC ............. *B01D 29/21* (2013.01); *B01D 29/96* (2013.01); *B01D 35/30* (2013.01);
(Continued)

(58) Field of Classification Search
CPC ........ B01D 29/21; B01D 29/96; B01D 35/30; B01D 2201/291; B01D 2201/295;
(Continued)

(56) References Cited

U.S. PATENT DOCUMENTS

2004/0108717 A1    6/2004  Matsubara et al.
2013/0180898 A1*   7/2013  Chajec .................. B01D 35/30
                                                      210/85

FOREIGN PATENT DOCUMENTS

EP    2609978 A1 *  7/2013  ........... B01D 29/232
EP    2609978 A1    7/2013
(Continued)

OTHER PUBLICATIONS

Dec. 25, 2018 Written Opinion of the Internatinoal Search Authority for PCT.IB2016.000981 (Year: 2018).*
(Continued)

*Primary Examiner* — Patrick Orme
(74) *Attorney, Agent, or Firm* — Venable LLP; Jeffri A. Kaminski (57) ABSTRACT

The filter element includes a filter medium having an axis and forming a channel extending substantially axially, a first and a second end plate, each end plate covering one axial end of the filter medium and being sealingly mounted on the axial end whereby a liquid to be filtered can flow through the filter medium towards the channel and out of the filter element through an opening in fluid communication with the channel, or reversely. The filter element includes a protrusion fixedly secured to the first end plate and extending outwardly from the first end plate, the protrusion being substantially tubular and having a through hole in fluid communication with the first end plate opening, the protrusion forming a female coupling piece of a male-female connector, and a locking member capable of releasably locking a male coupling piece of the male-female connector in the female coupling piece.

11 Claims, 10 Drawing Sheets

(52) U.S. Cl.
CPC .. *B01D 2201/291* (2013.01); *B01D 2201/303* (2013.01); *B01D 2201/4015* (2013.01); *B01D 2201/4053* (2013.01); *B01D 2201/4084* (2013.01)

(58) Field of Classification Search
CPC ...... B01D 2201/303; B01D 2201/4015; B01D 2201/4053; B01D 2201/4084; F16L 37/0841; F16L 37/091; F16L 37/148; F16L 37/244; F16L 37/252
See application file for complete search history.

(56) References Cited

FOREIGN PATENT DOCUMENTS

| | | | | | |
|---|---|---|---|---|---|
| JP | 2004-136203 | A | * | 5/2004 | ............. B01D 29/21 |
| JP | 2004136203 | A | | 5/2004 | |
| WO | 0110533 | A1 | | 2/2001 | |
| WO | WO-0110533 | A1 | * | 2/2001 | ........... B01D 29/111 |

OTHER PUBLICATIONS

International Search Report (dated Feb. 23, 2017) for corresponding International App. PCT/IB2016/000981.

* cited by examiner

FILTER ELEMENT FOR A VEHICLE

BACKGROUND AND SUMMARY

The invention relates to a filter element, in particular for filtering a liquid in a vehicle such as fuel or oil. The invention also relates to a liquid filtering device comprising such a filter element, and to a vehicle comprising such a liquid filtering device.

The invention can be applied in heavy-duty vehicles, such as trucks, buses and construction equipment.

Liquid filters are commonly provided in vehicles to remove contaminants from said liquid, which can be fuel or oil for example.

A conventional filter element may comprise a filter medium forming an axial channel, the axial ends of said filter medium being covered by end plates sealingly mounted on said axial ends. Furthermore, one end plate includes an opening in fluid communication with the channel. Such a filter element is housed in a casing comprising a housing and a lid, the casing comprising an inlet port and an outlet port for the liquid, one of said ports being in fluid communication with said opening.

Thus, a liquid to be filtered can flow inside the casing by the inlet, through the filter medium, and then the filtered liquid can exit the filter element by the opening and, ultimately, can exit the casing by the outlet. In use, a pipe carrying the liquid is connected to the port in communication with the opening, by means of a connecting device which can be fastened to the casing and which is further connected to the filter element to form a liquid passageway.

Because the filter medium progressively gets clogged, the filter element needs to be periodically changed so that it remains effective. To that end, the lid is removed from the housing, the old filter element is removed, and a new filter element is inserted in the housing before the lid is closed again.

Such an operation, which is repeated numerous times, may damage the connecting device and ultimately alter the filtration quality.

It therefore appears that, from several standpoints, there is room for improvement in filter elements.

It is desirable to provide a technical solution which ensures the robustness of a liquid filtering device over the long term, especially regarding the liquid-tight connection between the axial channel of the filter medium and the pipe carrying a liquid from or towards said axial channel.

According to an aspect of the present invention, a filter element comprises:

a filter medium having an axis and forming a channel extending substantially axially;

a first and a second end plates, each end plate covering one axial end of the filter medium and being sealingly mounted on said axial end, the first end plate having an opening in fluid communication with the channel;

whereby a liquid to be filtered can flow through the filter medium towards the channel and out of the filter element through the opening, or reversely, wherein the filter element further comprises:

a protrusion fixedly secured to the first end plate and extending outwardly from said first end plate, the protrusion being substantially tubular and having a through hole in fluid communication with the first end plate opening, the protrusion forming a female coupling piece of a male-female connector;

a locking member capable of releasably locking a male coupling piece of said male-female connector in the female coupling piece.

Owing to the invention, the female coupling piece of the male-female connector is replaced each time the filter element is changed, as said female coupling piece is fixedly secured to said filter element.

Such a configuration greatly improves the durability and efficiency of a liquid filtering device comprising such a filter element, insofar as said female coupling piece is the weak piece of the male-female connector. Indeed, said female coupling piece can undergo stresses each time it receives a male coupling piece and, moreover, said female coupling piece generally carries sealing members which get worn. Regularly replacing the female coupling piece, and generally the associated sealing members, therefore ensures a liquid-tight connection is achieved during the entire service life of the liquid filtering device.

In practice, the female coupling piece is designed to cooperate with a male coupling piece which is intended to be connected to a pipe, so that the filtered liquid can flow out of the filter element towards said pipe, or a liquid to be filtered can flow towards the filter element by said pipe.

The locking member may comprise at least one of:

an engaging portion designed to come into contact with an engaging portion of the male coupling piece when said male coupling piece is inserted in the female coupling piece by a user;

a locking portion designed to be in contact with a locking portion of the male coupling piece when said male coupling piece is mounted and locked in the female coupling piece;

a disengaging portion designed to come into contact with a disengaging portion of the male coupling piece when said male coupling piece is being disengaged from the female coupling piece by a user.

According to an embodiment, the engaging portion and/or the disengaging portion of the locking member comprise a tapered surface arranged to allow automatic engagement/disengagement of the male coupling piece without requiring a user to manipulate the locking member.

Such a disposition is of particular interest when the user cannot manipulate the locking member because it is located in a hard-to-access area. Moreover, such a disposition makes the engagement/disengagement of the male coupling piece easier, as the user generally holds the liquid filtering device in one hand and the male coupling piece in the other hand, and thus cannot manipulate the locking member in addition.

When the locking member comprises both an engaging portion and a disengaging portion each having a tapered surface, the tapered surface of the engaging portion and the tapered surface of the disengaging portion may have distinct orientations.

The locking member can comprise at least one tooth extending towards the axis of the female coupling piece through hole, said tooth comprising at least one among the engaging portion, the locking portion and the disengaging portion.

In an implementation, the locking member is a piece which is distinct from the female coupling piece and which is mounted in said female coupling piece.

The locking member is for example an elastically deformable member, which can be in an unstressed condition, in which it is capable of locking the male coupling piece in the female coupling piece, and which can be elastically deformed towards a stressed condition, in which it does not prevent the male coupling piece from being disengaged out of the female coupling piece. In other words, in the stressed condition, the locking member allows the male coupling piece to be disengaged out of the female coupling piece.

The locking member may comprise a deformable ring designed so that one transverse dimension of said deformable ring can increase as the male coupling piece is going through said deformable ring—i.e. for engagement and/or disengagement of the male coupling piece. The term "ring" does not mean that the locking member has the form of a circle. For example, such a ring could be substantially oval. Preferably, the deformation of the ring is automatically caused by the engaging/disengaging movement of the male coupling piece.

In an embodiment, the locking portion is located substantially in a plane parallel to the axis of the female coupling piece through hole, so as to prevent a rotation of the male coupling piece about said axis with respect to the female coupling piece. Furthermore, the female coupling piece comprises an abutment located substantially in a plane orthogonal to said axis, designed to be in contact with a portion of the male coupling piece when said male coupling piece is mounted in the female coupling piece, to prevent axial movement of the male coupling piece out of the female coupling piece.

Thus, the locking member only prevents the rotation of the male coupling piece, but does not form an axial retaining element. Said axial retention is achieved by the abutment arranged on the female coupling piece, which is generally a rigid piece and therefore provides a greater retaining force than a deformable element. This allows increasing the pull out force required to disconnect the male coupling piece from the female coupling piece.

According to an embodiment, the female coupling piece may comprise two radial walls which are orthogonal to the axis of the female coupling piece through hole, and which are spaced apart along said axis. The outermost radial wall—i.e. the radial wall located furthest from the end plate—comprises at least one radial notch for receiving at least one rib of the male coupling piece, at least a part of said radial wall located adjacent a notch forming an abutment designed to prevent axial movement of the male coupling piece out of the female coupling piece. In concrete terms, the abutment may be in contact with one rib.

The female coupling piece can comprise several notches, at least one notch having a peripheral dimension greater than the other notch(es), to enable a limited rotation of the male coupling piece with respect to the female coupling piece about the axis of the female coupling piece through hole. In case the locking member includes a tooth, as previously explained, said tooth can be located so as to face said larger notch.

The locking member can be mounted between said radial walls, and at least one radial cavity can be provided in the female coupling piece, between said radial walls, for receiving part of the locking member and allowing radial deformation of said locking member.

In an implementation, the female coupling piece is formed integrally with the first end plate. Thus, the female coupling piece can be formed with the first end plate as a single piece. For example, the female coupling piece and the first end plate are made of a plastic material. They can be molded as a single piece.

The female coupling piece may further comprise an inner sealing element for providing sealing with the male coupling piece, and an outer sealing element for providing sealing with a casing receiving said filter element.

The filter element can further comprise a male coupling piece configured to be engaged in the through hole of the female coupling piece, and intended to be connected to a pipe. The male coupling piece can comprise at least one of:

an engaging portion designed to come into contact with an engaging portion of the locking member when the male coupling piece is inserted in the female coupling piece by a user;

a locking portion designed to be in contact with a locking portion of the locking member when the male coupling piece is mounted and locked in the female coupling piece;

a disengaging portion designed to come into contact with a disengaging portion of the locking member the said male coupling piece is being disengaged from the female coupling piece by a user.

In an implementation, the engaging portion and/or the disengaging portion of the male coupling piece can comprise a tapered surface arranged to allow automatic engagement/disengagement of the male coupling piece without requiring a user to manipulate the locking member.

When the male coupling piece comprises both an engaging portion and a disengaging portion each having a tapered surface, the tapered surface of the engaging portion and the tapered surface of the disengaging portion can have distinct orientations.

According to an embodiment, the male coupling piece comprises at least one rib extending axially and protruding outwardly, said rib being designed to be inserted in at least one radial notch of the female coupling piece.

When the male coupling piece is mounted and locked in the female coupling piece, the at least one rib can be located between the radial walls of the female coupling piece and can be in contact with the abutment formed on the outermost radial wall.

The male coupling piece may further comprise a rotation stopper configured to be engaged in the notch having the greater peripheral dimension when the male coupling piece is mounted and locked in the female coupling piece.

The male coupling piece may further comprise a collar arranged to be in contact with the free axial end of the female coupling piece when the male coupling piece is mounted and locked in the female coupling piece. The "free axial end" of the female coupling piece means the axial end which is not secured to the filter element end plate. In an implementation, the collar can be elastically deformed when the male coupling piece is pushed further inside the female coupling piece from the locked position. This can be a preliminary step for disengaging the male coupling piece out of the female coupling piece.

According to a second aspect, the invention relates to a liquid filtering device comprising:

a casing comprising (i) a housing having a bottom wall, a peripheral wall, and an open axial end opposite the bottom wall and (ii) a lid removably secured to the housing at its open axial end;

a filter element as previously described, mounted in the casing;

an inlet and an outlet being arranged in the casing for a liquid to be filtered, respectively for the filtered liquid, one of the inlet and the outlet being in fluid communication with the through hole of the female coupling piece.

The lid can comprise a sleeve having the same axis as the filter element, and protruding outwardly, the sleeve opening both towards the channel of the filter medium and the outside of the liquid filtering device, the female coupling piece of the filter element being housed in said sleeve. A sealing member is generally provided between the female coupling piece and the sleeve.

According to a third aspect, the invention relates to a vehicle comprising a liquid filtering device as previously described, the liquid filtering device being designed to filter a liquid such as fuel or oil.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

A vehicle is conventionally equipped with a liquid filtering device 1, for example to filter oil or fuel.

As shown in FIGS. 29-34, such a liquid filtering device 1 comprises a casing 2 including a housing 3 and a lid 7. The housing 3, which is generally cylindrical, has an axis 10 and comprises a bottom wall 4, a peripheral wall 5, and an open axial end 6 opposite the bottom wall 4. The lid 7 is removably secured to the housing 3 at its open axial end 6. For example, the lid 7 comprises a disc-like plate 8 and a skirt 9 provided with an external thread for cooperation with an internal thread of the peripheral wall 5 of the housing 3. Two ports 11, 12 are arranged in the casing 2, one port being an inlet for a liquid to be filtered, the other one being an outlet for the filtered liquid. A pipe is sealingly mounted in fluid communication with each of the ports 11, 12 for carrying the liquid to be filtered/once filtered.

The liquid filtering device 1 also comprises a filter element 20 mounted in the casing 2, substantially coaxially. The filter element 20 comprises a filter medium 21 forming a channel 22 extending substantially axially. The filter medium 21 can be made of a sheet of cellulosic material folded so as to have, in cross section, the shape of a star having a plurality of branches. A rigid core 23 provided with holes 24 can be arranged in the channel 22 to prevent the filter medium 21 from flattening due to the liquid flow through it.

Figures 29, 30:
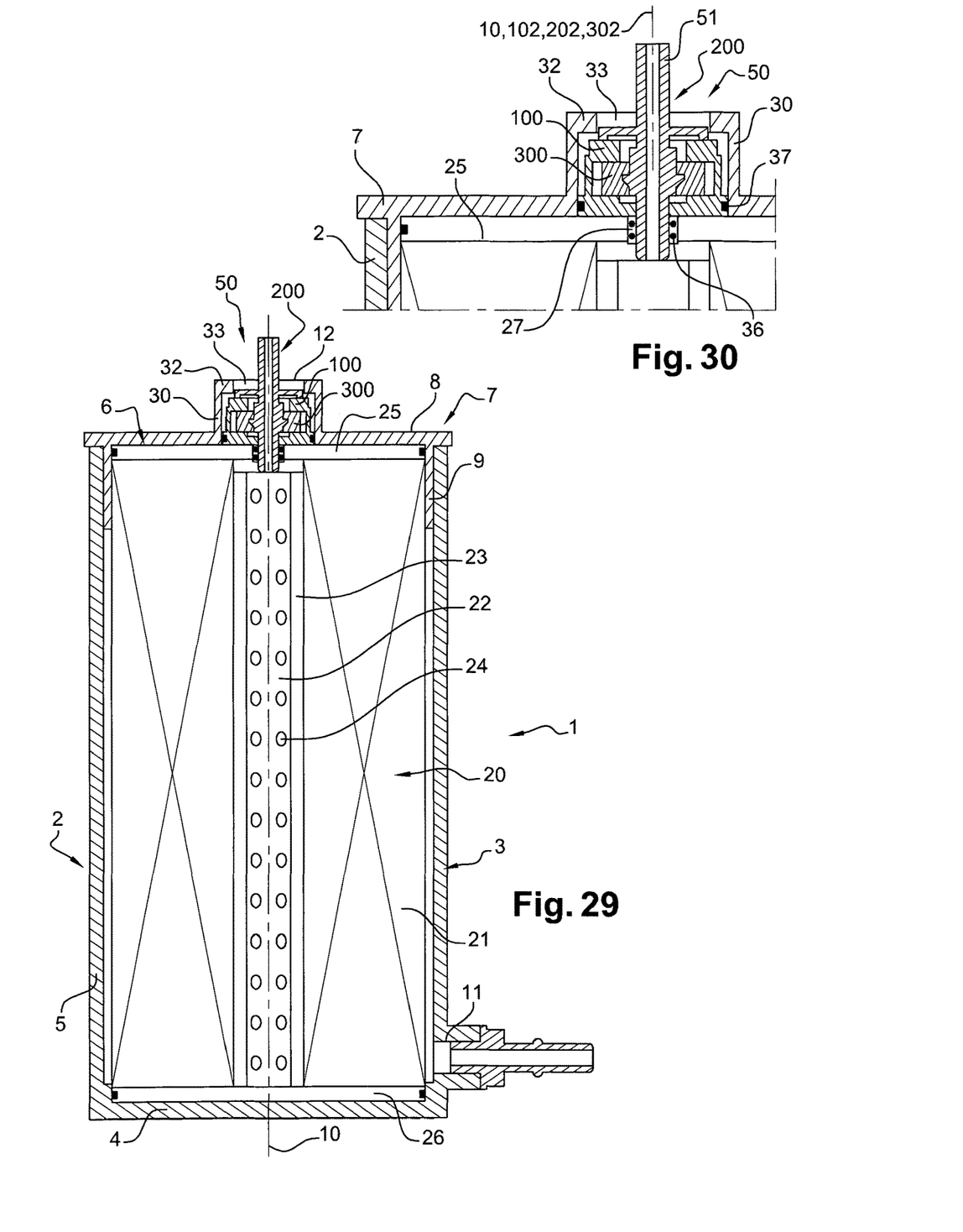
FIGS. 29, 31 and 33 are cross sections of various embodiments of a liquid filtering device comprising a filter element and a male-female connector.
FIGS. 30, 32 and 34 are detailed view of the male-female connector of the liquid filtering devices of FIGS. 29, 31 and 33, respectively.
Figures 31, 32:
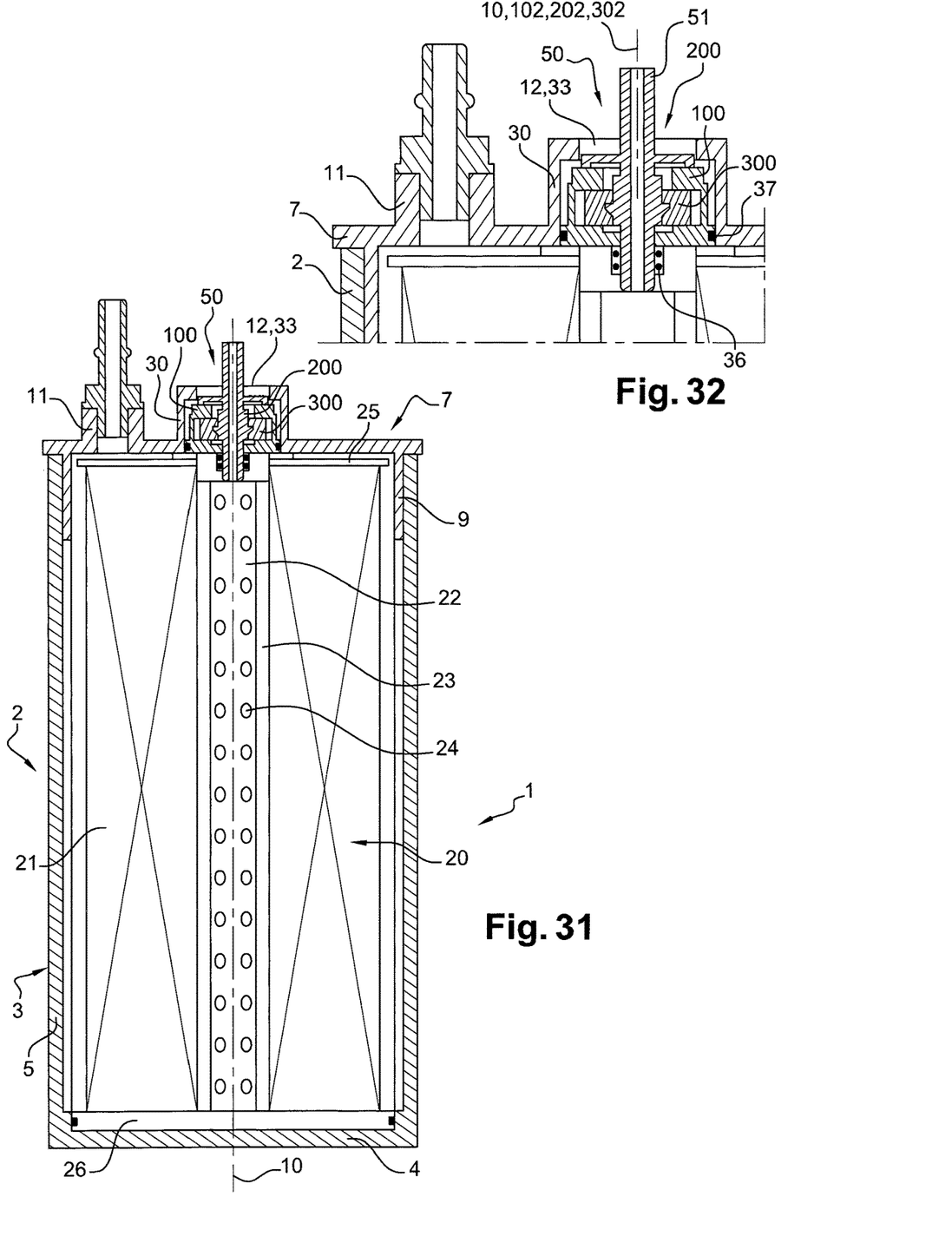
Figures 33, 34:
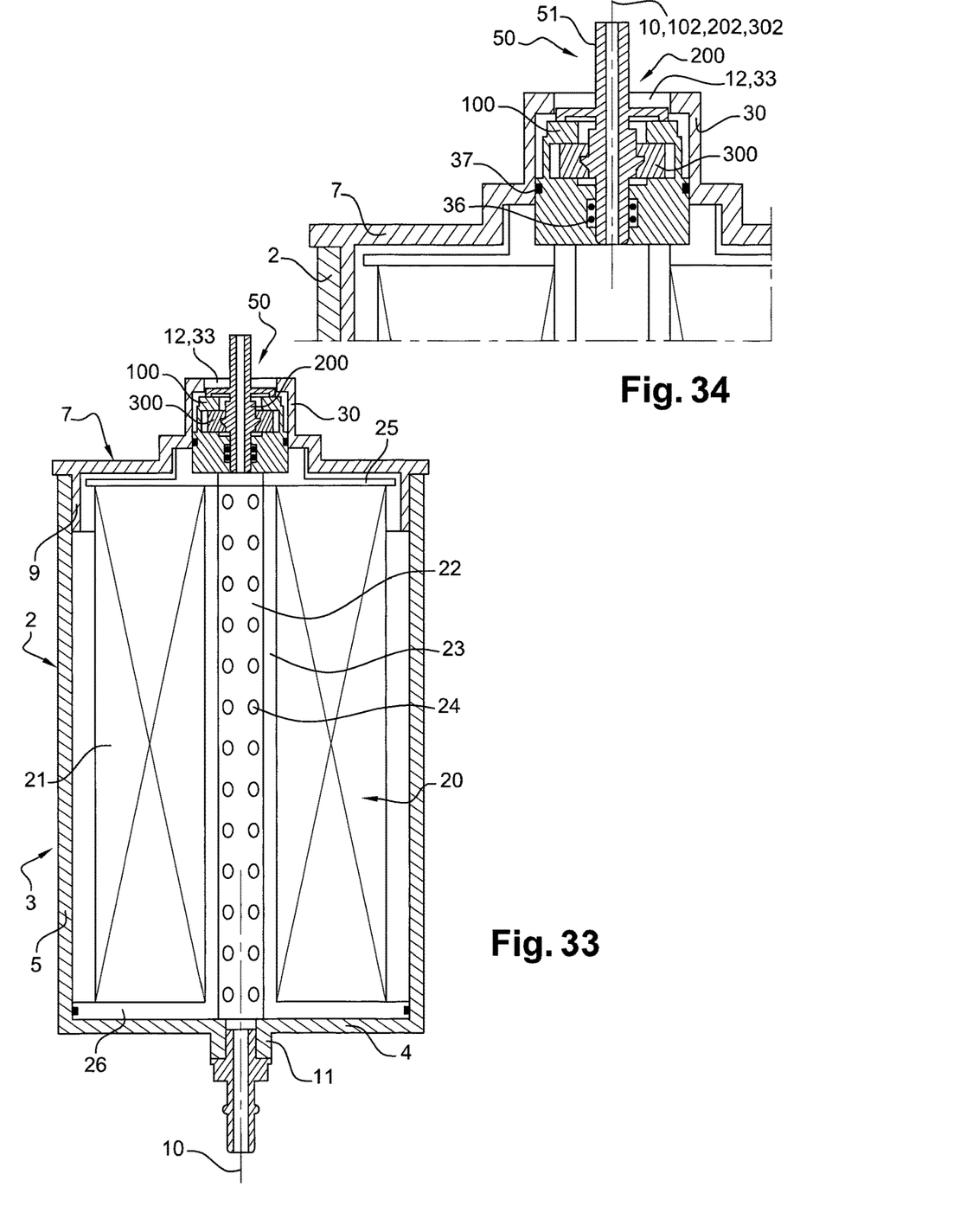

The filter element 20 further comprises a first and a second end plates 25, 26, each end plate covering one axial end of the filter medium 21 and being sealingly mounted on said axial end. The first end plate 25 has an opening 27 in fluid communication with the channel 22. Typically, the opening 27 can be coaxial with the channel 22. When the filter element 20 is mounted in the casing 2, the opening 27 is further in fluid communication with one of the ports 11, 12 of the casing 2.

In use, a liquid to be filtered flows from the inlet of the casing 2 through the filter medium 21, for example from the outside of the filter medium 21 towards the channel 22, and then out of the filter element 20 through the opening 27, and ultimately out of the liquid filtering device 1 through the outlet. Alternatively, the liquid to be filtered can flow reversely, i.e. from the channel 22 towards the outside of the filter medium 21.

As the end plates 25, 26 are sealingly mounted on the filter medium 21, the inside and the outside of the filter medium 21 are not in fluid communication, except through the filter medium 21.

One of the casing ports is connected to a pipe 51 via a male-female connector 50. The male-female connector 50 comprises:

a female coupling piece 100 which, according to the invention, is fixedly secured to the first end plate 25 of the filter element 20;

a male coupling piece 200 intended to be connected to the pipe 51 and to be engaged in the female coupling piece 100;

and a locking member 300 capable of releasably locking the male coupling piece 200 in the female coupling piece 100.

More precisely, the female coupling piece 100 forms a protrusion fixedly secured to the first end plate 25 and extending outwardly from said first end plate 25. This protrusion is substantially tubular and has a through hole 101 (represented on FIGS. 3, 21, 23, 24) in fluid communication with the first end plate opening 27. In a preferred embodiment and such as represented on FIGS. 29 to 34, the female coupling piece 100, opening 27 and channel 22 are substantially coaxial.

The female coupling piece 100 can be a piece separate from the first end plate 25 and fixedly secured thereto. Alternatively, the female coupling piece 100 and the first end plate 25 can be made as a single piece.

The female coupling piece 100 fixedly secured to the first end plate 25 can be, for instance, fused or glued to the first end plate 25 or secured to the first end plate 25 via mounting clips or screws.

The lid 7 of the liquid filtering device 1 can comprise a sleeve 30 having the same axis as the filter element 20 and protruding outwardly. The sleeve 30 opens both towards the channel 22 of the filter medium 21 and towards the outside of the liquid filtering device 1. The sleeve 30 may comprise an annular end wall 32 forming an opening 33 having a smaller diameter than the sleeve 30 itself.

The sleeve 30 is designed to house the female coupling piece 100 in the mounted position. In practice, when the lid 7 has been removed and the housing 3 is empty, a new filter element 20, equipped with a female coupling piece 100, can be put into the housing 3. Then, the lid 7 is reinstalled. To that end, the sleeve 30 is engaged around the female coupling piece 100—the diameter of the sleeve 30 being set accordingly—and the lid 7 is fastened to the housing 3, for example by screwing. The annular end wall 32 can form an additional retaining member for the female coupling piece 100, but the diameter of the opening 33 is large enough for the male coupling piece 200 to be inserted through it.

Several embodiments of a male-female connector 50 according to the invention will now be described.

In this application, the distal direction D must be understood as the direction of engagement of the male coupling piece in the female coupling piece, as opposed to the proximal direction P which is the direction of disengagement of the male coupling piece out of the female coupling piece.

A first embodiment of a male-female connector 50 is described with reference to FIGS. 1-11.

Figures 1, 2, 3, 4, 5, 6:
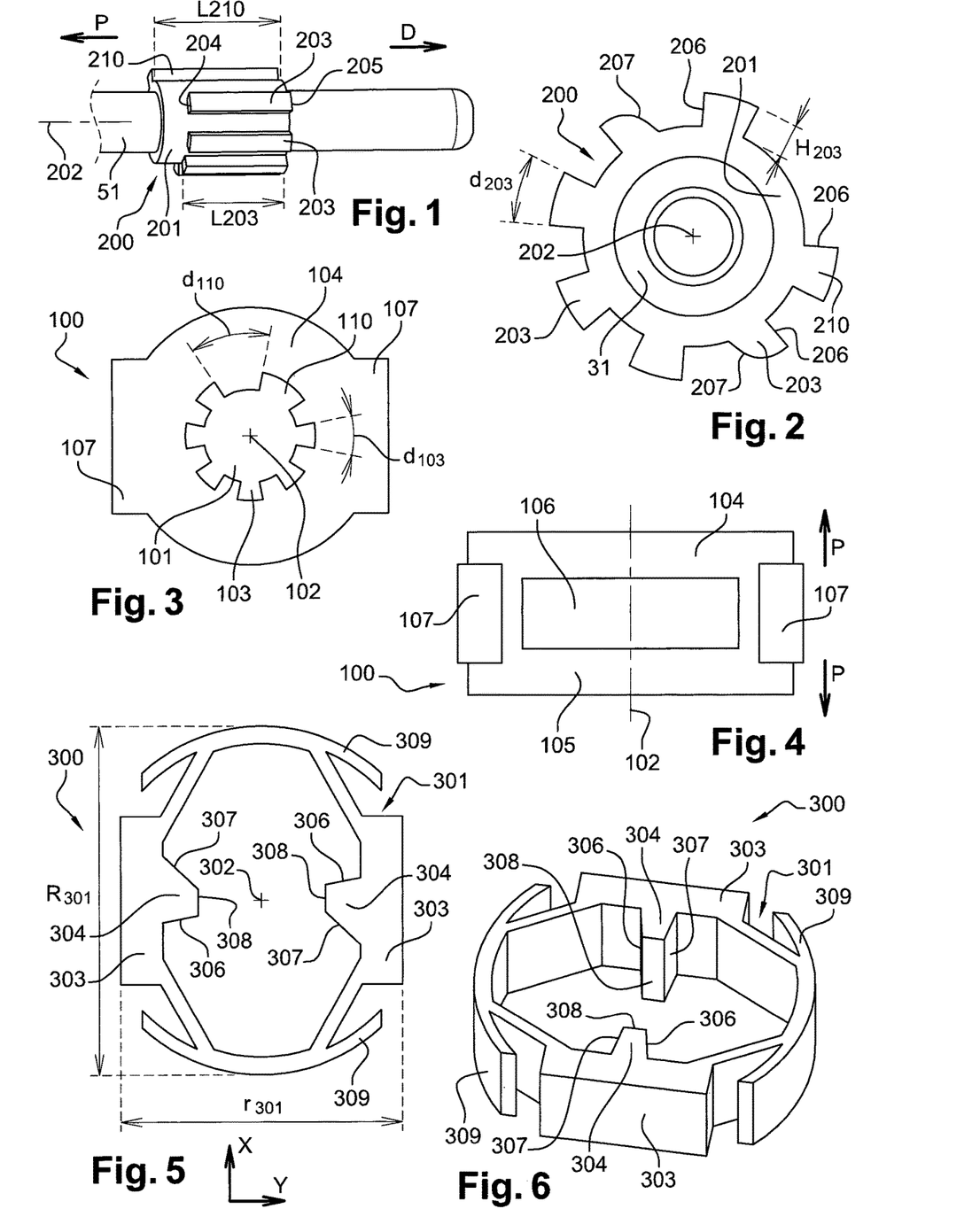
FIGS. 1 and 2 show a male coupling piece of a male-female connector according to a first embodiment of the invention, respectively seen in perspective and axially.
FIGS. 3 and 4 show a female coupling piece of a male-female connector according to a first embodiment of the invention, respectively seen axially and radially.
FIGS. 5 and 6 show a locking member designed to be mounted in the female coupling piece of FIG. 3, respectively seen axially and in perspective.

As shown in FIGS. 1 and 2, the male coupling piece 200 comprises a cylindrical portion 201 having an axis 202, and in which the pipe 51 can be fastened. The cylindrical portion 201 comprises ribs 203 which extend longitudinally, i.e. oriented parallel to the axis 202, and which protrude radially outwardly from the cylindrical portion 201 outer face. All ribs 203 extend from the distal end of the cylindrical portion 201. The ribs 203 have a proximal end face 204 which is substantially orthogonal to the axis 202, and a distal end face 205 which can also be substantially orthogonal to the axis 202. The ribs 203 have a same length L203 (along the axis 202), the same radial height H203, and the same peripheral dimension d203.

The cylindrical portion 201 also comprises a rotation stopper 210 which is located at least partially further proximally than the ribs 203, i.e. beyond the proximal end of the ribs 203 in the proximal direction P. In the illustrated embodiment, the rotation stopper 210 has a shape similar to that of the ribs 203, and extends from the distal end of the cylindrical portion 201 along a length L210 higher than L203.

As shown in FIG. 2, the ribs 203 all have a side face 206 which is oriented radially, while two opposite ribs 203—with respect to the axis 202—further have a tapered side face 207, the function of which will be explained later.

As shown in FIGS. 3 and 4, the female coupling piece 100 has an axis 102 and have an axial through hole 101. The diameter of the through hole 101 is substantially identical, or slightly greater than the diameter of the outer face of the cylindrical portion 201 of the male coupling piece 200.

The female coupling piece 100 comprises two walls which are orthogonal to the axis 102 and which have a substantially identical annular shape, namely a proximal wall 104 and a distal wall 105. The walls 104, 105 are spaced apart along the axis 102 and are linked by opposite side members 107 extending substantially axially. Thus, two apertures 106 are formed between the walls 104, 105 and between the side members 107, said apertures 106 opening both towards the axis 102 and towards the outside of the female coupling piece 100. The distance between the walls 104, 105 is substantially identical to the length L203 of the ribs 203.

The proximal wall 104 comprises radial notches 103 each intended to receive one rib 203 of the male coupling piece 200. The notches have substantially the same height and peripheral dimensions as the ribs 203. One specific notch 110, hereinafter referred to as "the larger notch" 110 has a peripheral dimension d110 greater than the peripheral dimension d103 of the other notches 103, for example twice the peripheral dimension d103 of the other notches 103. Two bigger notches 110 may be provided, for example arranged symmetrically with respect to the axis 102.

The locking member 300, illustrated in FIGS. 5 and 6, is a piece which is distinct from the female coupling piece 100 and which is mounted in said female coupling piece 100.

The locking member 300 comprises a ring 301 having an axis 302. As shown in FIG. 5, the ring 301 is not circular but substantially included in an oval. It therefore has a large radial dimension R301 along a first radial direction X, and a small radial dimension r301<R301 in a second radial direction Y orthogonal to the first radial direction X.

Along the first radial direction X, the locking member 300 has opposite end walls 303 which can be substantially box-shaped. A tooth 304 extends from each end wall 303 towards the axis 302. Each tooth 304 has a substantially radial side face 306, a tapered side face 307, and an inner face 308 extending substantially along direction X. The teeth 304 are substantially symmetrical with respect to axis 302.

Along the second radial direction Y, the locking member 300 has opposite end walls 309 which are curved and convex. The walls 309 are substantially symmetrical with respect to axis 302.

The locking member 300 is an elastically deformable member, which can be in an unstressed condition, as illustrated in FIGS. 5 and 6, and which can be elastically deformed towards a stressed condition, in which dimension r301 has increased.

Figures 9, 10, 11, 12:
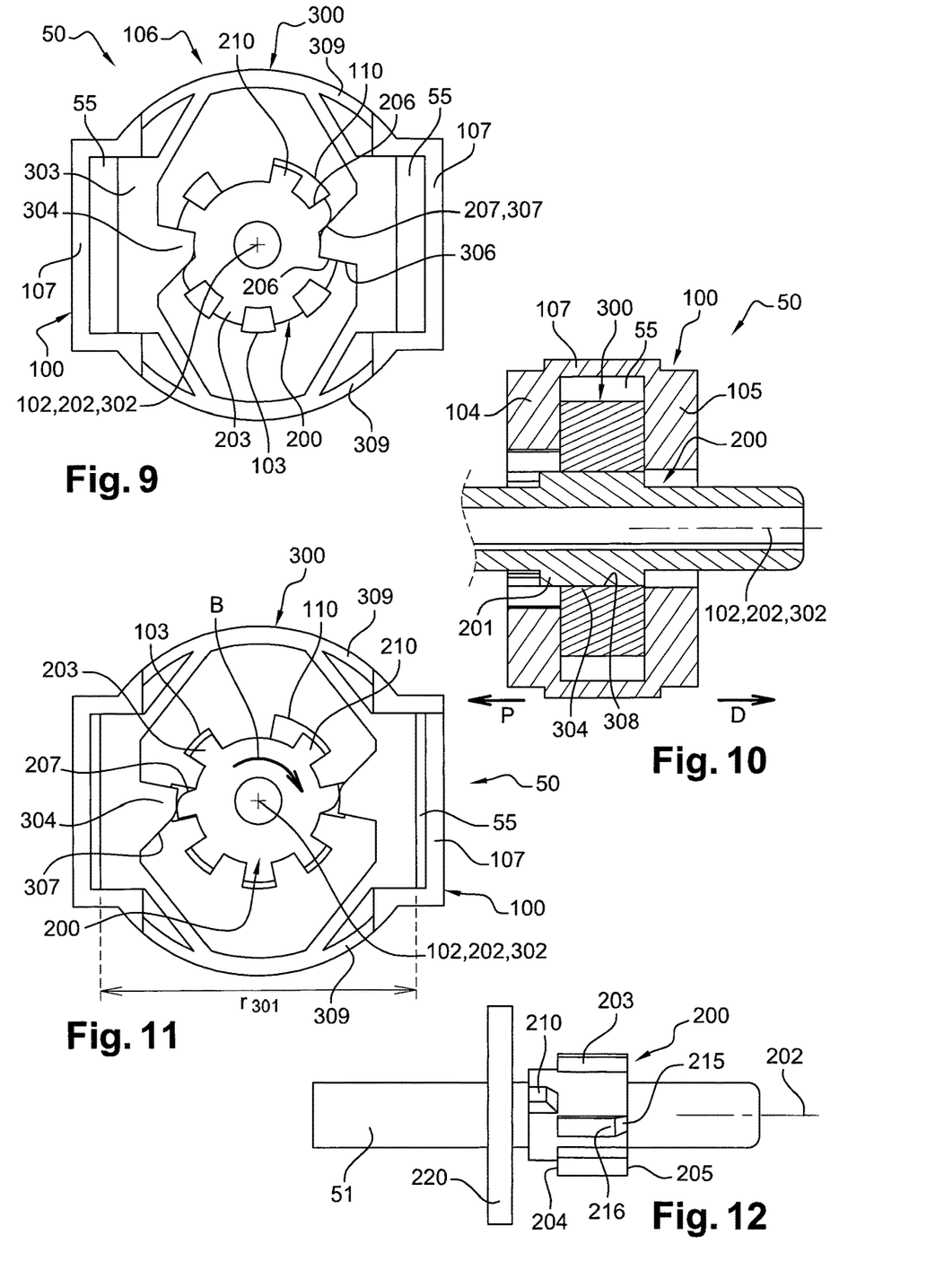
FIGS. 9 and 10 show the male-female connector in the mounted and locked position.
FIG. 11 shows a first step for disengaging the male coupling piece out of the female coupling piece.
FIG. 12 is a perspective view of a male coupling piece according to a variant of the first embodiment.

As shown in FIGS. 9, 10 and 11, the locking member 300 is mounted in the female coupling piece 100 between the walls 104, 105, substantially coaxially. In the mounted position, the locking member 300 is in the unstressed condition. The walls 309 are then located in the apertures 106 and are substantially level with the periphery of the walls 104, 105. The walls 303 are located near the side members 107, in a cavity, so that a gap 55 is provided between each wall 303 and the corresponding side member 107, as shown in FIG. 9.

Each of the teeth 304 is located in one of the notches 103, with the inner face 308 substantially located level with the cylindrical face of the through hole 101.

Figure 7:
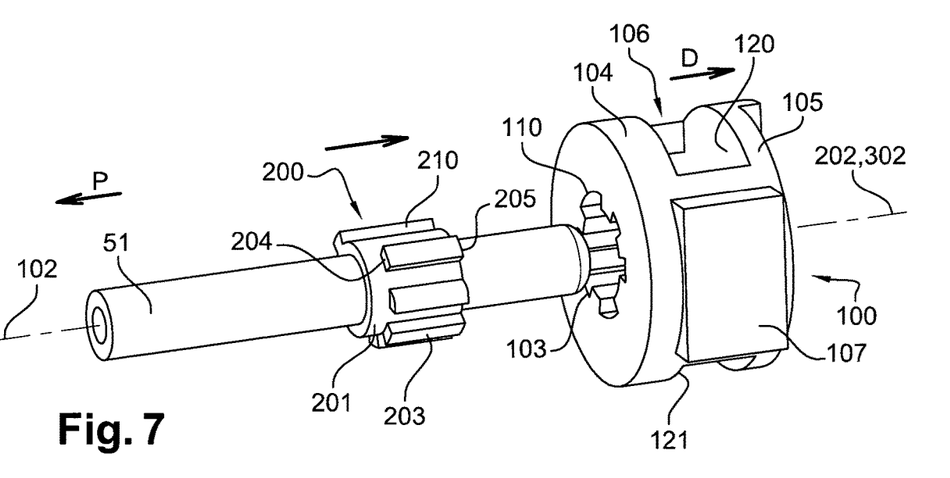
FIGS. 7 and 8 show two successive steps for mounting the male coupling piece in the female coupling piece.

For connecting the male-female connector 50, typically after the filter element 20 has been changed, the pipe 51 equipped with the male coupling piece 200 is moved axially distally to be inserted in the through hole 101 of the female coupling piece 100, as shown in FIG. 7. During this movement, the male coupling piece 200 is oriented such that the ribs 203 can enter the notches 103, and such that the rotation stopper 210 can enter the larger notch 110.

When a rib 203 inserted in a notch 103 which receives one tooth 304 comes into contact with said tooth 304, a further movement of the male coupling piece 200 in the distal direction D causes a movement of the tooth 304 radially outwardly, by elastic deformation of the locking member 300 (which is not shown in FIG. 7) towards its stressed condition, dimension r301 increasing. Such a deformation is possible because of the gap 55 previously described.

Thus, the distal end face 205 of said rib 203 forms an engaging portion of the male coupling piece 200, while the inner face 308 of said tooth 304 forms an engaging portion of the locking member 300. To make this deformation easier, the distal end face 205 of said rib 203 and/or the inner face 308 of said tooth 304 may be tapered.

Figure 8:
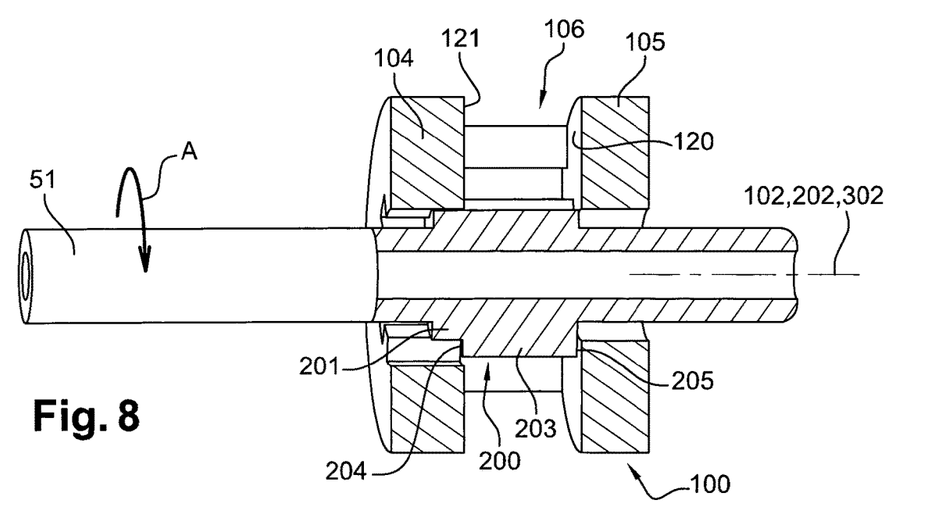

The user pushes the male coupling piece 200 distally until the end faces 205 of the ribs 203 come into contact with the proximal face 120 of the distal wall 105 of the female coupling piece 100. Then, the proximal end faces 204 of the ribs 203 are substantially in the same transverse plane as the distal face 121 of the proximal wall 104 of the female coupling piece 100, as shown in FIG. 8. The ribs 203 are no longer located in the notches 103 and therefore do not prevent rotation of the male coupling piece 200 about axis 102. In this configuration, the rotation stopper 210 is still located in the larger notch 110.

The user can then turn the male coupling piece 200 about axis 102 inside the female coupling piece 100, according to arrow A shown in FIG. 8, in an angular range allowed by the peripheral dimension d110 of the larger notch 110, i.e. until the rotation stopper 210 comes into contact with one side of said larger notch 110.

The various components are configured so that, when the rotation stopper 210 abuts one side of the larger notch 110, each tooth 304 no longer faces a rib 203, but a space between two adjacent ribs 203, as shown in FIG. 9. The locking member 300 thus elastically returns to its unstressed condition, each tooth 304 being located between two adjacent ribs 203.

In this position, as shown in FIGS. 9 and 10, the radial side face 306 of a tooth 304 is adjacent the radial side face 206 of a rib 203. Said radial faces 206, 306 thus form locking portions of the male coupling piece 200, respectively of the locking member 300. The male coupling piece 200 is then mounted and locked in the female coupling piece 100.

In this mounted and locked position, the locking member 300 prevents the male coupling piece 200 from rotating about axis 102 with respect to the female coupling piece 100. Furthermore, the proximal end faces 204 of the ribs 203 are no longer facing a notch 103, but rather are in contact with the distal face 121 of the proximal wall 104 of the female coupling piece 100. As a result, because of this abutment, the male coupling piece 200 cannot be pulled proximally out of the female coupling piece 100, unless the male coupling piece 200 is previously rotated reversely, which cannot happen incidentally because of the locking member 300.

When the filter element 20 needs to be changed, the male coupling piece 200 must be disengaged out of the female coupling piece 100.

To that end, a user first turns the male coupling piece 200 bout axis 102 inside the female coupling piece 100, according to arrow B shown in FIG. 11, i.e. in the direction opposite arrow A. The rotation stopper 210 is thus moved in the larger notch 110.

As a result, because of the cooperation between the tapered side faces 207, 307 of the male coupling piece 200 and of the locking member 300, respectively, the locking member 300 deforms elastically such that radial dimension r301 increases. Such a deformation is possible because of the gap 55, as previously explained. Thus, the tapered side faces 207, 307 form a disengaging portion respectively of the male coupling piece 200 and of the locking member 300.

Further rotation of the male coupling piece 200 in the direction of arrow B is possible, until the teeth 304 face a rib 203, the ribs 203 than being in line with the notches 103.

The user can then pull the male coupling piece 200 proximally, in order to disengage the male coupling piece 200 out of the female coupling piece 100.

It follows from the above that, owing to the tapered surfaces, the engagement/disengagement of the male coupling piece 200 with respect to the female coupling piece 100 is automatic and does not require a user to manipulate the locking member 300. Such a configuration is all the more interesting as the locking member 300 may not be accessible for the user, in particular when it is housed in the sleeve 30 of the lid 7, as shown in FIGS. 29-34.

FIG. 12 shows a variant of the male coupling piece 200 of the embodiment of FIGS. 1-11. According to this variant, the rotation stopper 210 does not extend over the whole axial length of the cylindrical portion 201, but only from the proximal end face 204 of the ribs 203 up to the proximal end face of the cylindrical portion 201.

Besides, a projection 216 having a tapered distal end face 215 may be provided near the cylindrical portion distal end face, in order to make easier the tooth 304 radial deformation during engagement of the male coupling piece 200 in the female coupling piece 100.

The male coupling piece 200 may further comprise a collar 220, for example intended to prevent undesirable substances to enter the male-female connector 50.

A second embodiment of a male-female connector 50 will now be described with reference to FIGS. 13-28. A component which is similar to the first embodiment is referenced with the same number. Besides, the similar components are not fully described again.

Figures 13, 14, 15, 16, 17, 18:
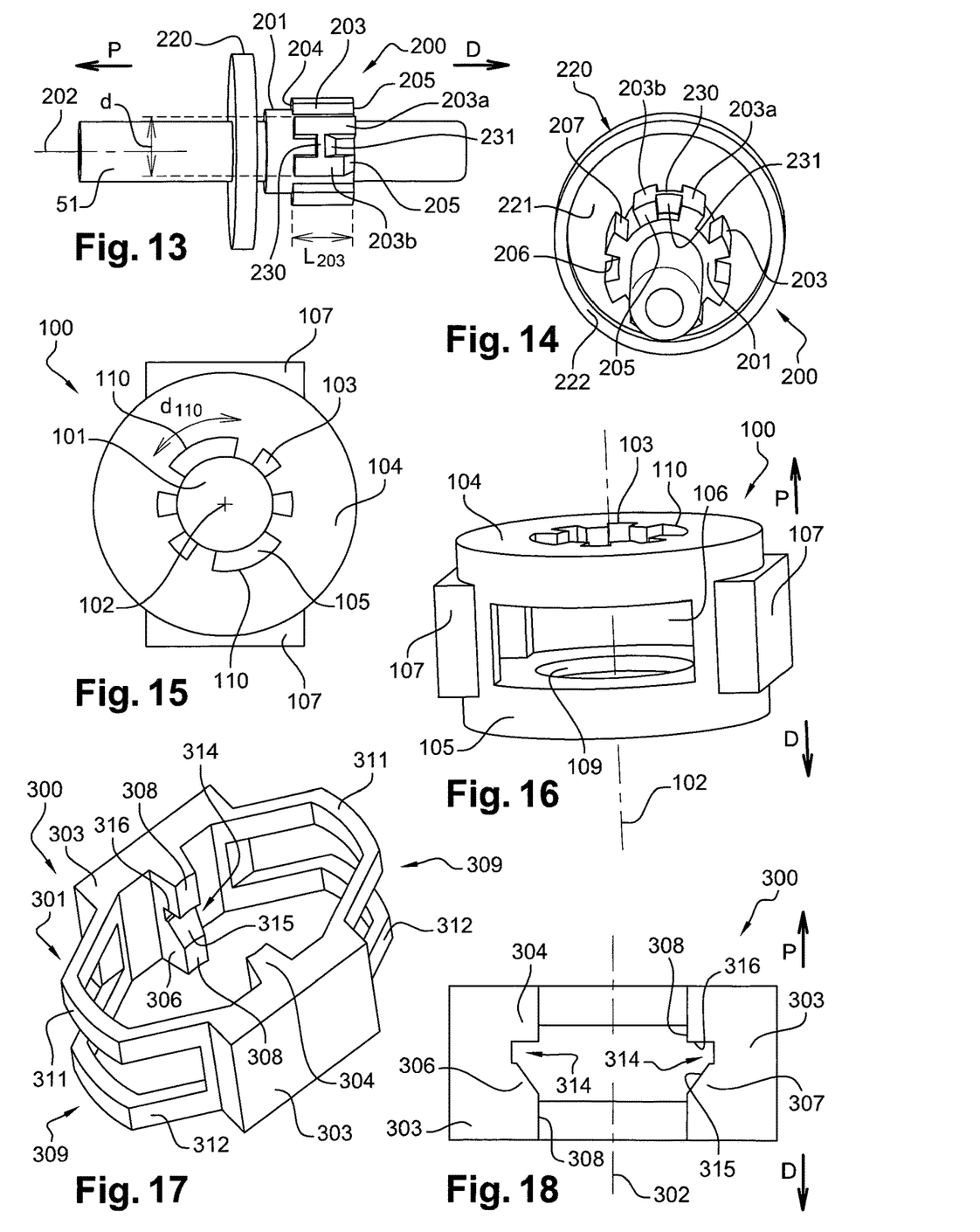
FIGS. 13 and 14 are perspective views of a male coupling piece of a male-female connector according to a second embodiment of the invention, respectively seen substantially radially and substantially axially.
FIGS. 15 and 16 show a female coupling piece of a male-female connector according to a second embodiment of the invention, respectively seen axially and seen in perspective substantially radially.
FIGS. 17 and 18 show a locking member designed to be mounted in the female coupling piece of FIG. 15, respectively seen in perspective and in a radial section.

As shown in FIGS. 13 and 14, the male coupling piece 200 comprises a plurality of ribs 203 which extend from the distal end of the cylindrical portion 201 along the same length L203. In the illustrated embodiment, no rotation stopper in the form of a longer rib is provided. Two specific ribs 203a, 203b are joined by a transverse bar 230 which protrudes outwardly from the outer face of the cylindrical portion 201, substantially along the peripheral direction and forming with specific ribs 203a, 203b a general H shape. The distal end face 231 of the bar 230 is tapered, and the distal end face 205 of rib 203b is also tapered, for reasons that will be explained later. d is the peripheral dimension of the component consisting of or comprising the ribs 203a, 203b and the transverse bar 230, as shown in FIG. 13. A similar component consisting of or comprising ribs 203a, 203b and a transverse bar 230 can be arranged on the cylindrical portion 201, symmetrically with respect to axis 202.

The male coupling piece 200 further comprises a collar 220. Said collar comprises a main transverse wall 221 having a circular periphery, and spaced apart from the ribs proximal end face 204 in the proximal direction P. The main transverse wall 221 may further be spaced apart from the cylindrical portion 201 in the proximal direction P. A cylindrical skirt 222 extends distally from the periphery of the main transverse wall 221. In this second embodiment, both side faces 206, 207 of the ribs 203 can be oriented substantially radially.

The female coupling piece 100, as shown in FIGS. 15-16, can be substantially identically to the female coupling piece 100 of the first embodiment. However, the female coupling piece 100 of the second embodiment comprises an inner annular shoulder 109 which is arranged in the distal wall 105, around the through hole 101, and which opens in the proximal direction P.

Besides, the peripheral dimension d110 of a larger notch 110 is high enough to receive the component consisting of or comprising the ribs 203a, 203b and the transverse bar 230. For example, d110 is substantially equal to d.

In FIGS. 17 and 18 show a locking member 300 according to the second embodiment. Each end wall 309 of the ring 301 can be made of two substantially identical arches, namely a distal arch 311 and a proximal arch 312 which are spaced apart in the axial direction.

A tooth 304 extends from each end wall 303 towards the axis 302. Each tooth 304 comprises a slit 314 so that the tooth 304 has a proximal portion and a distal portion separated by said slit 314. The slit 314 forms a distal surface 315 which is tapered, and a proximal surface 316 which is substantially orthogonal to the axis 302. The side faces 306 and 307 of each tooth 304 can be substantially radially oriented, and not tapered, as they will not be used to disengage the male coupling piece 200 out of the female coupling piece 100 as will be explained later.

Figure 19:
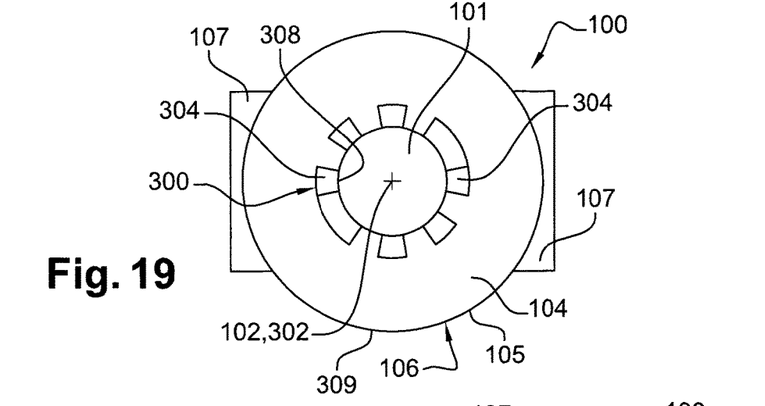
FIG. 19 is a perspective view of the female coupling piece of FIG. 16 with the locking member mounted in it.

FIG. 19 shows the locking member 300 mounted in the female coupling piece 100. Each of the teeth 304 is located in one of the larger notches 110, for example substantially adjacent a side of said larger notch 110. Moreover, the inner face 308 of each tooth 304 is substantially located level with the cylindrical face of the through hole 101.

Figure 20:
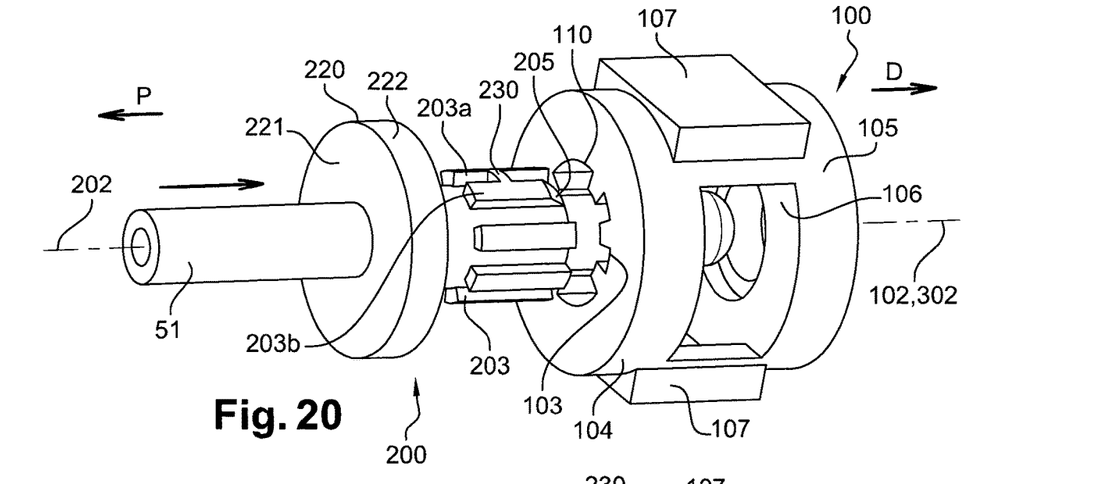
FIGS. 20 and 21 show two successive steps for mounting the male coupling piece in the female coupling piece.
Figure 21:
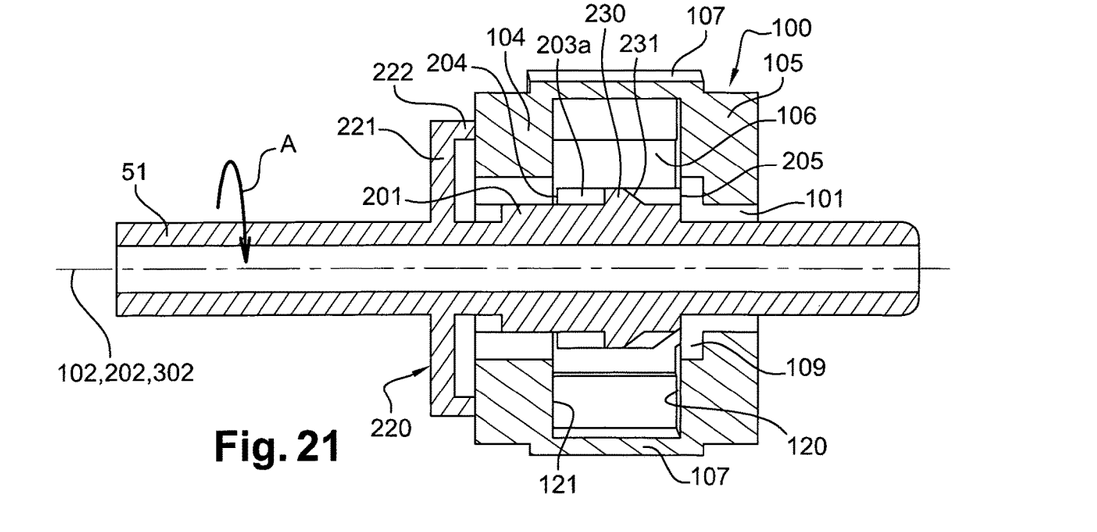

For connecting the male-female connector 50, typically after the filter element 20 has been changed, the pipe 51 equipped with the male coupling piece 200 is moved axially distally to be inserted in the through hole 101 of the female coupling piece 100, as shown in FIG. 20. During this movement, the male coupling piece 200 is oriented such that the ribs 203 can enter the notches 103, and such that the ribs 203a, 203b and the transverse bar 230 can enter the larger notch 110.

Thus, the tapered distal end face 205 of rib 203b comes into contact with the inner face 308 of a tooth 304 and, as the movement of the male coupling piece 200 in the distal direction D continues, the tooth 304 is made to move radially outwardly, by elastic deformation of the locking member 300 (which is not shown in FIG. 20) towards its stressed condition, dimension r301 increasing. Such a deformation is possible because of the gap 55 previously described.

Figure 26:
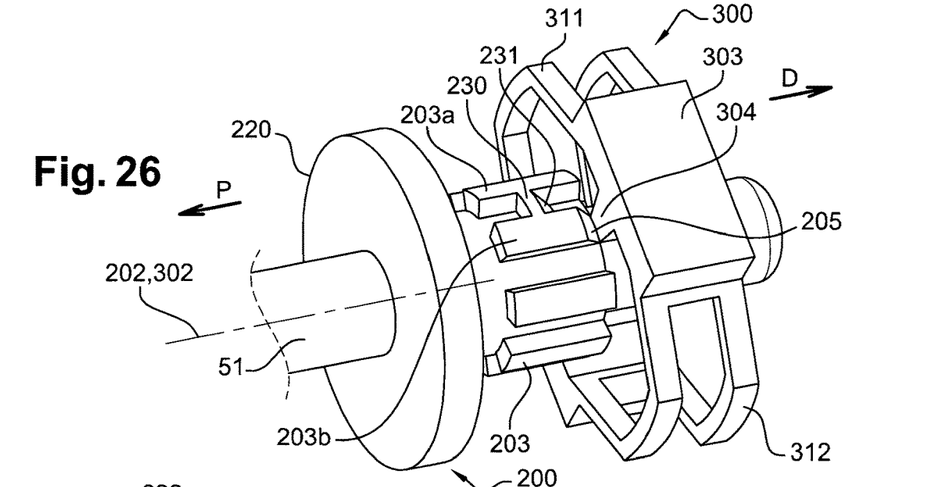
FIG. 26 is a perspective view of the male coupling piece of FIG. 13 engaging the locking member of FIG. 17, showing an engaging portion and a disengaging portion on said male coupling piece.
Figure 27:
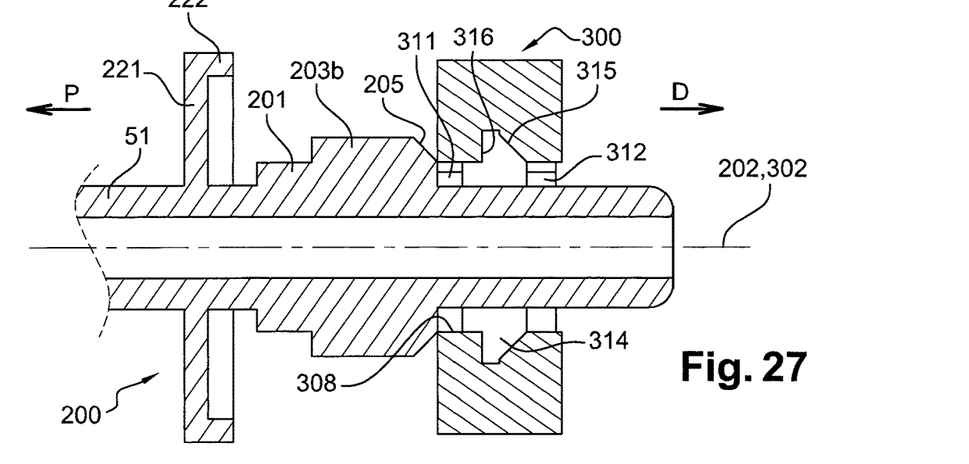
FIG. 27 shows the function of the engaging portion during the engagement of the male coupling piece in the locking member.
Figure 28:
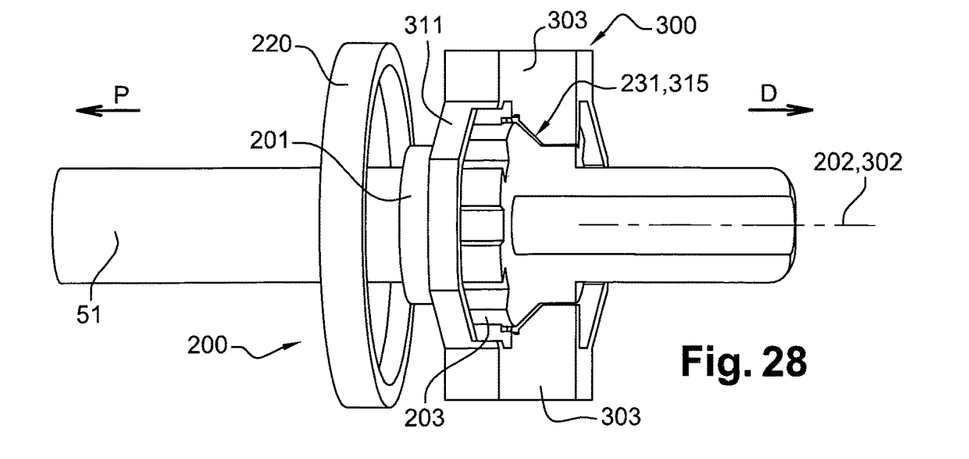
FIG. 28 shows the function of the disengaging portion during the disengagement of the male coupling piece out of the locking member.

Thus, as more specifically shown in FIGS. 26 and 27, the distal end face 205 of said rib 203b forms an engaging portion of the male coupling piece 200, while the inner face 308 of said tooth 304 forms an engaging portion of the locking member 300. To make this deformation easier, the inner face 308 of said tooth 304 may be tapered too.

The user pushes the male coupling piece 200 distally until the skirt 222 of the collar 220 comes into contact with the proximal face of the female coupling piece 100. In this position, illustrated in FIG. 21, the end faces 205 of the ribs 203 are substantially in the same transverse plane as the proximal face 120 of the distal wall 105 of the female coupling piece 100, but not it contact with said proximal face 120, as they face the annular groove 109. Moreover, the proximal end faces 204 of the ribs 203 are substantially in the same transverse plane as the distal face 121 of the proximal wall 104 of the female coupling piece 100. The ribs 203, 203a, 203b are no longer located in the notches 103, 110 and therefore do not prevent rotation of the male coupling piece 200 about axis 102. Besides, the inner face 308 of the tooth 304 is in contact with the outer face of the rib 203b, and the slit 314 is substantially in the same transverse plane as the transverse bar 230.

Figure 22:
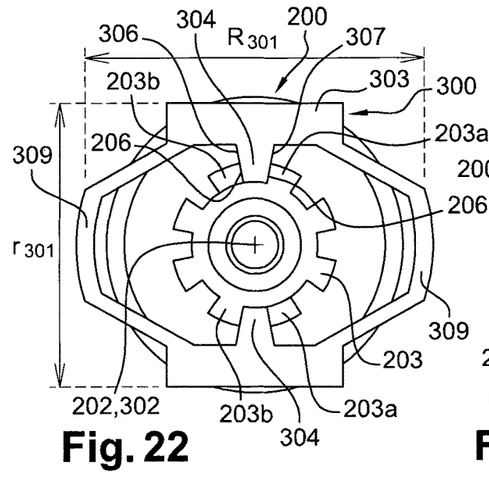
FIGS. 22 and 23 show the male-female connector in the mounted and locked position.

The user can then turn the male coupling piece 200 about axis 102 inside the female coupling piece 100, according to arrow A shown in FIG. 22. As a result, the transverse bar 230 turns until it faces the slit 314 of the locking member 300. Then, the proximal and distal portions of the tooth 304 are no longer in contact with the rib 203b, but face the depressed areas on the proximal and distal sides of the transverse bar 230. The locking member 300 thus elastically returns to its unstressed condition, and the transverse bar 230 is housed in the slit 314.

Figure 23:
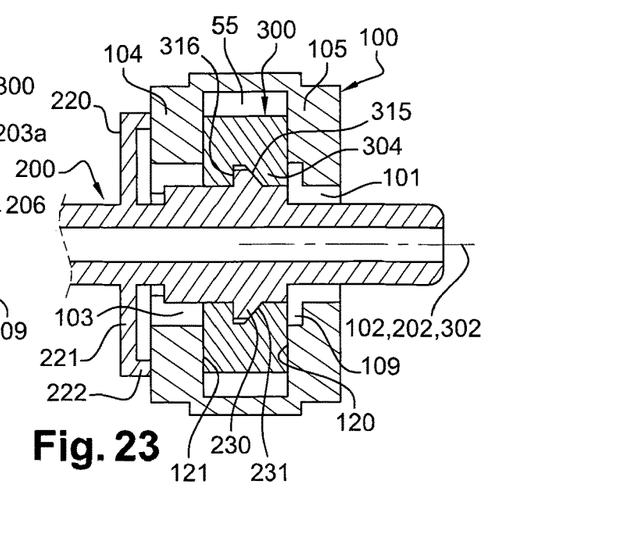

In this position, as shown in FIGS. 22 and 23, the tooth 304 is located between ribs 203a and 203b. The radial side face 206 of the ribs 203a and 203b form locking portions of the male coupling piece 200, and cooperate with the side faces 306, 307 of the tooth 304, which form locking portions of the locking member 300. The male coupling piece 200 is then mounted and locked in the female coupling piece 100.

Thus, in this mounted and locked position, the locking member 300 prevents the male coupling piece 200 from rotating about axis 102 with respect to the female coupling piece 100. Furthermore, the proximal end faces 204 of the ribs 203, 203a, 203b are no longer facing a notch 103, 110 but rather are in contact with the distal face 121 of the proximal wall 104 of the female coupling piece 100 (not shown on FIG. 22). As a result, because of this abutment, the male coupling piece 200 cannot be pulled proximally out of the female coupling piece 100, unless the male coupling piece 200 is previously rotated reversely, which cannot happen incidentally because of the locking member 300.

Besides, in this position, the collar 220 allows preventing undesirable substances to enter the male-female connector 50.

When the filter element 20 needs to be changed, the male coupling piece 200 must be disengaged out of the female coupling piece 100.

Figure 24:
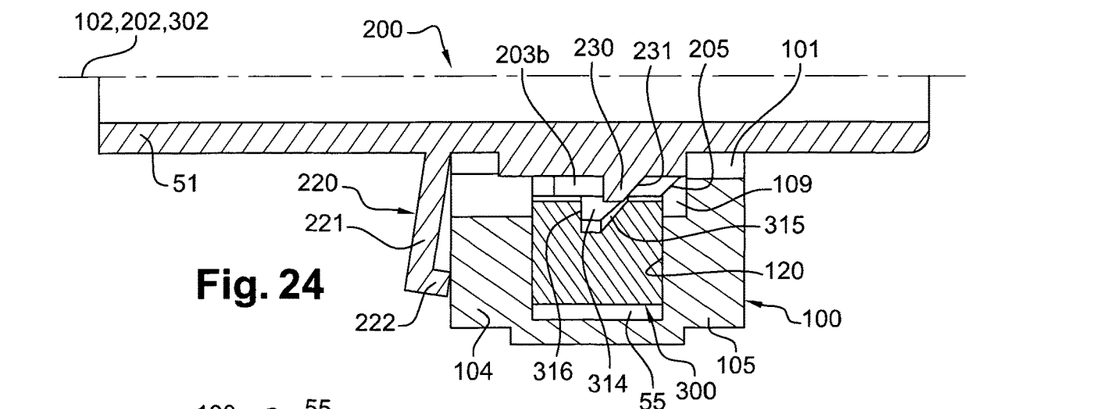
FIGS. 24 and 25 show a first step for disengaging the male coupling piece out of the female coupling piece, respectively in an axial section and in a radial section.

To that end, a user first pushes the male coupling piece 200 distally inside the female coupling piece 100. This is made possible because of the inner annular shoulder 109, which provides space for a further insertion of the male coupling piece 200 from the position of FIG. 23, and because the collar 220, which is configured to be elastically deformed, as shown in FIG. 24.

This results in a movement of the tooth 304 radially outwardly, because of the cooperation between the tapered distal end face 231 of the bar 230 and of the tapered distal surface 315 formed by the slit 314 of the locking member. Such a cooperation is shown in FIG. 24. In other words, the locking member 300 deforms elastically towards its stressed condition, such that radial dimension r301 increases (see FIG. 25). Such a deformation is possible because of the gap 55, as previously explained. Thus, the tapered faces 231, 315 form a disengaging portion respectively of the male coupling piece 200 and of the locking member 300.

The inner face 308 of each tooth 304 is then in contact with the outer face of the transverse bar 230, meaning that the tooth 304 cannot prevent the rotation of the male coupling piece 200 about axis 102 anymore.

Figure 25:
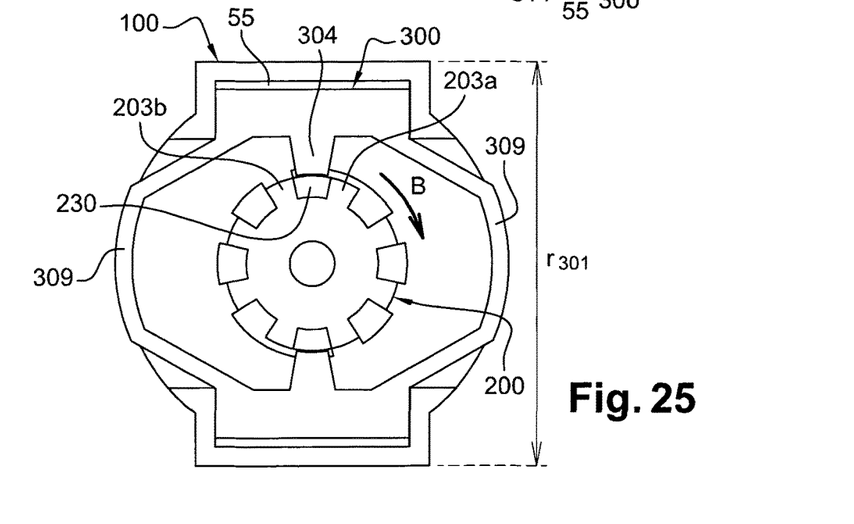

A user can then turn the male coupling piece 200 bout axis 102, according to arrow B shown in FIG. 25, i.e. in the direction opposite arrow A, until the ribs 203a, 203b and transverse bar 230 can enter a larger notch 110 towards the proximal direction P. The user can then pull the male coupling piece 200 proximally, in order to disengage the male coupling piece 200 out of the female coupling piece 100, as shown in FIGS. 26 and 27.

It follows from the above that, owing to the tapered surfaces, the engagement/disengagement of the male coupling piece 200 with respect to the female coupling piece 100 is automatic and does not require a user to manipulate the locking member 300. Such a configuration is all the more interesting as the locking member 300 may not be accessible for the user, in particular when it is housed in the sleeve 30 of the lid 7, as shown in FIGS. 29-34.

Because the disengagement of the male coupling piece 200 out of the female coupling piece 100 requires first a pushing action and then a rotating movement, the male-female connector 50 of the second embodiment is more robust as regards incidental disconnection.

Reference is now made to FIGS. 29-34 which show several implementations of the first end plate 25 of the filter element 20 and the female coupling piece 100 fixedly secured thereto, a male coupling piece 200 being mounted and locked in the female coupling piece 100.

As shown in these figures, the female coupling piece 100 comprises an inner sealing element 36 for providing sealing with the male coupling piece 200, and an outer sealing element 37 for providing sealing with the casing 2, for example with the inner face of the sleeve 30 of the lid 7. A sealing element may comprise one or more annular gaskets.

In the figures, the female coupling piece 100 is mounted at the second port 12 of the casing 2, this port 12 being coaxial with the liquid filtering device 1 and being located in the top part of the casing 2. Such an exemplary disposition allows easily purging the air out of the casing 2 when the male coupling piece 200 is disengaged from the female coupling piece 100 before the lid 7 is opened.

As regards the first port 11, it can be located either in the peripheral wall 5, for example near the bottom wall 4 (FIG. 29), in the lid 7 (FIG. 31) or in the bottom wall 4 (FIG. 33).

The invention therefore provides a liquid filtering device having great sealing properties that can be guaranteed over time, insofar as the weak part of the male-female connector, namely the female coupling piece, is changed each time the filter element is changed. This advantage is not achieved at the detriment of the easy mounting, as the invention provides automatic locking and unlocking of the male-female connector.

It is to be understood that the present invention is not limited to the embodiments described above and illustrated in the drawings; rather, the skilled person will recognize that many changes and modifications may be made within the scope of the appended claims.

The invention claimed is:

1. A filter element comprising:
   a filter medium having an axis and forming a channel extending substantially axially along the filter medium axis;
   a first and a second end plates, each end plate covering one axial end of the filter medium and being sealingly mounted on said axial end, the first end plate having an opening in fluid communication with the channel whereby a liquid to be filtered can flow through the filter medium towards the channel and out of the filter element through the opening, or reversely, wherein the filter element further comprises:
   a protrusion fixedly secured to the first end plate and extending outwardly from said first end plate, the protrusion being substantially tubular and having a through hole in fluid communication with the first end plate opening, the protrusion forming a female coupling piece of a male-female connector;
   a locking member capable of releasably locking a male coupling piece of said male-female connector in the female coupling piece, wherein:
   the locking member is a piece which is a separate piece from the female coupling piece and which is mounted in said female coupling piece;

the male coupling piece includes at least one rib, the female coupling piece comprises two radial walls which are orthogonal to an axis of a female coupling piece through hole, and which are spaced apart along said axis of the female coupling piece through hole, the radial wall of the two radial walls that is outermost along said axis of the female coupling piece through hole comprising at least one radial notch for receiving the at least one rib of the male coupling piece, at least a part of said radial wall located adjacent a notch forming an abutment for said at least one rib designed to prevent axial movement of the male coupling piece out of the female coupling piece along said axis of the female coupling piece through hole;
   the locking member is mounted between said radial walls; and
   at least one radial cavity is provided in the female coupling piece, between said radial walls, for receiving part of the locking member and allowing radial deformation of said locking member.

2. The filter element according to claim 1, wherein the locking member comprises a deformable ring designed so that one transverse dimension of said deformable ring can increase as the male coupling piece is going through said deformable ring.

3. The filter element according to claim 1, wherein the female coupling piece comprises several notches, at least one notch having a peripheral dimension greater than the other notch(es), to enable a limited rotation of the male coupling piece with respect to the female coupling piece about the axis of the female coupling piece through hole.

4. The filter element according to claim 1, wherein the male coupling piece comprises at least one of the at least one ribs extending axially and protruding radially outwardly, said at least one of the at least one ribs being designed to be inserted in at least one radial notch of the female coupling piece.

5. The filter element according to claim 1, wherein, when the male coupling piece is mounted and locked in the female coupling piece, the at least one rib is located between the radial walls of the female coupling piece and is in contact with the abutment formed on the radial wall of the two radial walls that is outermost along said axis of the female coupling piece through hole.

6. The filter element according to claim 1, wherein the male coupling piece further comprises a rotation stopper configured to be engaged in the notch having the greater peripheral dimension when the male coupling piece is mounted and locked in the female coupling piece.

7. The filter element according claim 1, wherein the male coupling piece comprises a collar arranged to be in contact with an end of the female coupling piece when the male coupling piece is mounted and locked in the female coupling piece.

8. The filter element according to claim 7, wherein the collar is adapted to be elastically deformed when the male coupling piece is pushed further inside the female coupling piece from a locked position.

9. A liquid filtering device comprising:
- a casing comprising a housing having a bottom wall, a peripheral wall, and an open axial end opposite the bottom wall and a lid removably secured to the housing at its open axial end;
- a filter element according to claim 1, mounted in the casing;
- an inlet and an outlet being arranged in the casing for a liquid to be filtered via the filter element, one of the inlet and the outlet being in fluid communication with the through hole of the female coupling piece.

10. The liquid filtering device according to claim 9, wherein the lid comprises a sleeve having a same axis as the filter element, and protruding in a direction axially outwardly from the filter element, the sleeve opening both towards the channel of the filter medium and the outside of the liquid filtering device, the female coupling piece of the filter element being housed in said sleeve.

11. A vehicle, including a liquid filtering device according to claim 9, the liquid filtering device being a fuel or oil filter.

\* \* \* \* \*